United States Patent
Tsukamoto et al.

(10) Patent No.: US 9,276,429 B2
(45) Date of Patent: Mar. 1, 2016

(54) METHOD AND APPARATUS FOR EXTENDING BATTERY OPERATION TIME OF AN ELECTRONIC DEVICE

(71) Applicants: Yasumichi Tsukamoto, Yamato (JP);
Shigefumi Odaohhara, Yamato (JP);
Hiromitsu Yamaguchi, Hiratsuka (JP);
Tetsuji Nakamura, Yokohama (JP)

(72) Inventors: Yasumichi Tsukamoto, Yamato (JP);
Shigefumi Odaohhara, Yamato (JP);
Hiromitsu Yamaguchi, Hiratsuka (JP);
Tetsuji Nakamura, Yokohama (JP)

(73) Assignee: LENOVO (SINGAPORE) PTE LTD, Singapore (SG)

(*) Notice: Subject to any disclaimer, the term of this patent is extended or adjusted under 35 U.S.C. 154(b) by 766 days.

(21) Appl. No.: 13/623,430

(22) Filed: Sep. 20, 2012

(65) Prior Publication Data
US 2013/0106192 A1     May 2, 2013

(30) Foreign Application Priority Data

Oct. 31, 2011 (JP) ................... 2011-238289

(51) Int. Cl.
*H02J 1/00* (2006.01)
*H02J 3/00* (2006.01)
*H02J 7/00* (2006.01)
*H02J 9/00* (2006.01)

(52) U.S. Cl.
CPC ............... *H02J 7/0068* (2013.01); *H02J 7/00* (2013.01); *H02J 9/00* (2013.01); *Y10T 307/516* (2015.04); *Y10T 307/658* (2015.04); *Y10T 307/724* (2015.04)

(58) Field of Classification Search
CPC ........... H02J 7/00; H02J 9/00; Y10T 307/516
USPC ........................................ 307/46, 85
See application file for complete search history.

(56) References Cited

U.S. PATENT DOCUMENTS

| 2009/0085523 | A1* | 4/2009 | Kim ............................. 320/138 |
| 2011/0101781 | A1* | 5/2011 | Roepke et al. .................. 307/66 |
| 2011/0234172 | A1* | 9/2011 | Kung ............................ 320/137 |

FOREIGN PATENT DOCUMENTS

| JP | 2005-184065 | 7/1993 |
| JP | 06-217464 | 8/1994 |
| JP | 08-251830 | 9/1996 |
| JP | 2008-251830 | 9/1996 |
| JP | 3155237 | 11/2009 |

* cited by examiner

*Primary Examiner* — Carlos Amaya
(74) *Attorney, Agent, or Firm* — Antony P. Ng; Russell Ng PLLC

(57) ABSTRACT

An apparatus for supplying power to a portable electronic device is disclosed. The apparatus includes a first receptacle to which an AC/DC adaptor is connectable, a second receptacle to which an electronic device is connectable, a battery charger for charging a battery using power supplied by the AC/DC adaptor, an output circuit for supplying power to the electronic device from the AC/DC adaptor when the AC/DC adaptor is connected to the apparatus, and supplies power to the electronic device from the battery when the AC/DC adaptor is not connected to the apparatus, and a control circuit for controlling the battery charger to supply power to the electronic device while charging the battery when the AC/DC adaptor is connected to the apparatus.

5 Claims, 9 Drawing Sheets

METHOD AND APPARATUS FOR EXTENDING BATTERY OPERATION TIME OF AN ELECTRONIC DEVICE

PRIORITY CLAIM

The present application claims benefit of priority under 35 U.S.C. §§120, 365 to the previously filed Japanese Patent Application No. JP2011-238289 with a priority date of Oct. 31, 2011, which is incorporated by reference herein.

BACKGROUND OF THE INVENTION

1. Technical Field

The present invention relates to electronic apparatuses in general, and in particular to a technique for extending battery operation time of an electronic apparatus that is being powered by a DC power source such as an AC/DC adaptor.

2. Description of Related Art

Portable electronic apparatuses such as a laptop personal computers (PCs), tablet computers, and multi-function mobile phones can be operated using DC power sources. As power sources for portable electronic apparatuses, there are AC power sources and DC power sources. DC power sources include internal batteries that are mounted within portable electronic apparatuses, or external batteries connected to portable electronic apparatuses via cables.

When using an AC power source, AC power is generally converted into DC power using an AC/DC adaptor, and the power is supplied to a portable electronic apparatus. Both the internal battery and the external battery are required to be charged by the AC power source. The internal battery is typically charged using the AC/DC adaptor. A dedicated battery charger is required to charge the external battery.

For portable electronic apparatuses, there is a constant demand for lengthening the time of operation using only battery (i.e., battery operation time). In the laptop PCs, this demand is satisfied by mounting a large-sized battery pack that protrudes from a casing of a main body, additionally mounting a battery pack in a multi-purpose bay, or carrying a spare battery pack that is charged in advance.

SUMMARY OF THE INVENTION

In accordance with a preferred embodiment of the present disclosure, an apparatus for supplying power to a portable electronic device includes a first receptacle to which an AC/DC adaptor is connectable, a second receptacle to which an electronic device is connectable, a battery charger for charging a battery using power supplied by the AC/DC adaptor, an output circuit for supplying power to the electronic device from the AC/DC adaptor when the AC/DC adaptor is connected to the apparatus, and supplies power to the electronic device from the battery when the AC/DC adaptor is not connected to the apparatus, and a control circuit for controlling the battery charger to supply power to the electronic device while charging the battery when the AC/DC adaptor is connected to the apparatus.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Outline of Power Supply System

Figure 1:
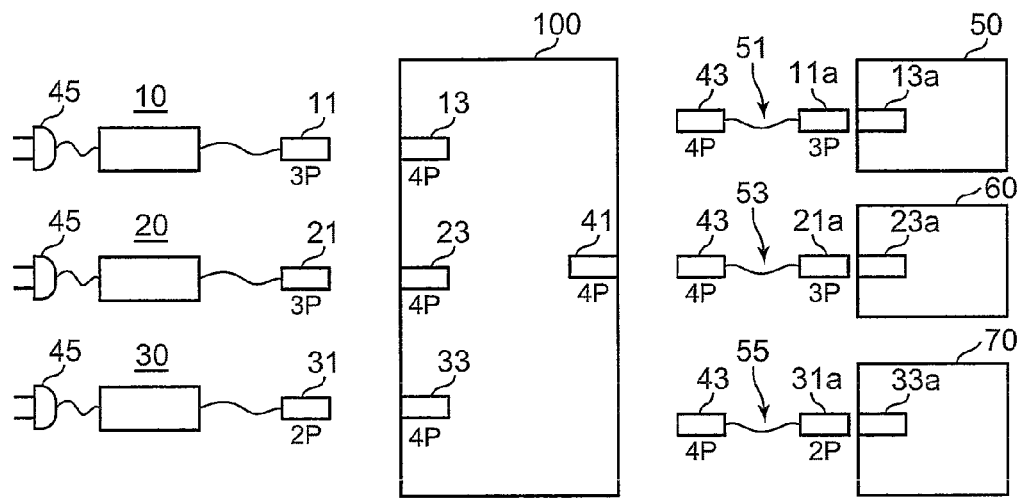
FIG. 1 is a block diagram of a power supply system.

FIG. 1 is a block diagram of a power supply system according to the present embodiment. The power supply system includes AC/DC adaptors 10, 20 and 30, a battery unit 100, portable electronic apparatuses 50, 60 and 70, and cable assemblies 51, 53 and 55. The number of the AC/DC adaptors and the portable electronic apparatuses is an example. The portable electronic apparatuses 50, 60 and 70 may be laptop PCs or tablet terminals. In the AC/DC adaptors 10, 20 and 30, an AC plug 45 is connected on a primary side, and DC plugs 11, 21 and 31 are connected on a secondary side.

Each of the DC plugs 11 and 21 has a three-port structure formed of a power source port, a ground port, and an ID port, and the DC plug 31 has a two-port structure of a power source port and a ground port. Three dedicated receptacles 13, 23 and 33 are provided on the primary side of the battery unit 100, and a single common receptacle 41 is provided on the secondary side thereof. In addition, the number of the dedicated receptacles and the common receptacle is an example.

In the cable assemblies 51, 53 and 55, a DC plug 43 is provided on the primary side thereof, and DC plugs 11a, 21a and 31a are provided on a secondary side thereof. The DC plug 43 of any of the cable assemblies 51, 53 and 55 has a four-port structure including two ID ports and fits the common receptacle 41. The portable electronic apparatuses 50, 60 and 70 are respectively provided with dedicated receptacles 13a, 23a and 33a. The portable electronic apparatuses 50, 60 and 70 do not include an interface for being supplied with power from an external device except for the dedicated receptacles 13a, 23a and 33a.

In terms of current-voltage characteristics, the AC/DC adaptor 10 supplies power only to the portable electronic apparatus 50, the AC/DC adaptor 20 supplies power only to the portable electronic apparatus 60, and the AC/DC adaptor 30 supplies power only to the portable electronic apparatus 70. In order to secure a combination of the AC/DC adaptor and the portable electronic apparatus of the same power specification, the DC plug 11 of the AC/DC adaptor 10 is formed so as to fit only the dedicated receptacles 13 and 13a, the DC plug 21 of the AC/DC adaptor 20 is formed so as to fit only the dedicated receptacles 23 and 23a, and the DC plug 31 of the AC/DC adaptor 30 is formed so as to fit only the dedicated receptacles 33 and 33a. The dedicated receptacles 13 and 13a, 23 and 23a, and 33 and 33a conform to each other in shapes. Therefore, the AC/DC adaptor 10 cannot supply power through connection to the portable electronic apparatuses 60 and 70 with a different power specification. The other AC/DC adaptors 20 and 30 cannot also supply power to other portable electronic apparatuses with a different power specification.

Next, an outline of an operation of the power supply system will be described. The AC/DC adaptors 10, 20 and 30 are able to be respectively connected to the corresponding dedicated receptacles 13, 23 and 33 at the same time, but only one AC/DC adaptor that is initially connected is effective. Any one of the portable electronic apparatuses 50, 60 and 70 is connected to the common receptacle 41 via any one of the cable assemblies 51, 53 and 55.

The battery unit 100 is able to support any AC/DC adaptor having a DC plug of a three-port structure and a two-port structure. The DC plugs 31 having the two-port structure are considerably employed in an old-fashioned AC/DC adaptor or an AC/DC adaptor of a tablet terminal. The DC plugs 11 and 21 are able to express the rated capacities of the AC/DC adaptors to the battery unit 100 and the portable electronic apparatuses 50 and 60 via the ID port. Therefore, there are several rated capacities in each of the AC/DC adaptors 10 and 20.

The portable electronic apparatuses 50 and 60 recognize the rated capacity of the battery unit 100 or the AC/DC adaptors 10 and 20 connected to the corresponding dedicated receptacles 13a and 23a and control power consumption so as not to exceed the rated capacities. As such, to suppress power consumption of a system device in order to put the power consumption within a target rated capacity is referred to as power management. The power management also includes an operation in a lower power mode when an operation is performed using either a battery set 223 (see FIG. 5) embedded in a laptop PC 50 or a battery set 129 embedded in the battery unit 100 than when an operation is performed using the AC/DC adaptor 10, and an operation of transition to a hibernation state or a stopping state when remaining capacities of the battery sets 223 and 129 is reduced.

The DC plugs 31 and 31a do not have an ID port and thus do not express the rated capacity to the battery unit 100 and the portable electronic apparatus 70. Therefore, the portable electronic apparatus 70 does not perform power management targeting the rated capacity acquired from the AC/DC adaptor 30. In the present embodiment, the rated capacity which is the lowest rated capacity of the rated capacities of the AC/DC adaptors 10, 20 and 30 which may possibly be connected to the portable electronic apparatuses 50, 60 and 70 is defined as a lowest rated capacity. The portable electronic apparatus 70 performs power management with respect to the predefined lowest rated capacity. The battery unit 100 includes a battery charger, a battery set, a processor, and the like.

The common receptacle 41 includes an ID port using which the battery unit 100 expresses the rated capacity to the portable electronic apparatuses 50 and 60. For example, when the AC/DC adaptor 10 and the portable electronic apparatus 50 are connected to the battery unit 100, power is supplied to the portable electronic apparatus 50 which performs power management in a range of the rated capacity of the AC/DC adaptor 10 or a range of the lowest rated capacity. When the AC/DC adaptor 10 stops supplying power since the commercial power source fails or the DC plug 11 is released, power is able to be supplied to the portable electronic apparatus 50 from the battery set mounted in the battery unit 100. The battery unit 100 charges the battery set due to a difference between the rated capacity of the AC/DC adaptor and power consumption of the portable electronic apparatus.

It is assumed that a state where any one of the AC/DC adaptors 10, 20 and 30 is connected to the battery unit 100 is an adaptor connection state, and a state where none of the AC/DC adaptors 10, 20 and 30 is connected thereto is an independent state. Naturally, the independent state also includes a state where the AC plug 45 is released although the DC plugs 11, 21 and 31 are connected, and a state where power supply of an outlet is stopped although the AC plug 45 and the DC plugs 11, 21 and 31 are connected.

In order to secure conform of the power specification in the combinations of the AC/DC adaptors 10, 20 and 30 that supply power and the portable electronic apparatuses 50, 60 and 70, the battery unit 100 to which the AC/DC adaptor 10 is connected does not supply power to the portable electronic apparatuses 60 and 70 when connected to the common receptacle 41. When the portable electronic apparatuses 50 and 60 cannot recognize the rated capacity expressed by the battery unit 100 or the AC/DC adaptors 10 and 20, power management is able to be performed targeting the lowest rated capacity.

The portable electronic apparatuses 50 and 60 recognize whether an external power source connected to the dedicated receptacles 13a and 23a is the battery unit 100 or the AC/DC adaptors 10 and 20. When it is recognized that the battery unit 100 is connected to the dedicated receptacles 13a and 23a, the portable electronic apparatuses 50 and 60 acquire and manage information or the remaining capacity or deterioration information of the battery set of the battery unit in the same manner as the battery pack mounted in the main body. When the battery unit 100 is connected to the dedicated receptacle 33a, the portable electronic apparatus 70 determines that the AC/DC adaptor 30 is connected and does not manage the battery set during an operation.

B. AC/DC Adaptor

Figure 2:
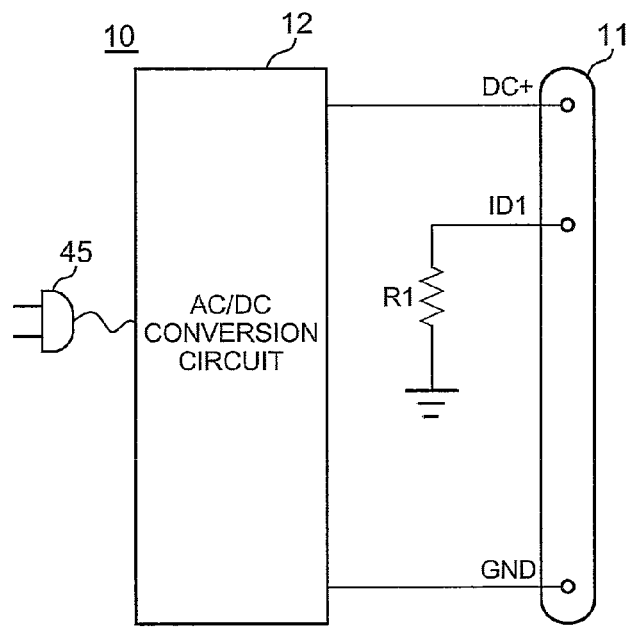
FIG. 2 is a block diagram of an AC/DC adaptor.

FIG. 2 is a block diagram of the AC/DC adaptor 10. The AC/DC adaptor 10 includes the AC plug 45, an AC/DC conversion circuit 12, an identification resistor R1, and the DC plug 11. The AC plug 45 is connected to an outlet of the commercial power source in a range of AC 100 V to 240 V. The AC/DC conversion circuit 12 converts an AC voltage into DC 20V (−0.5/+1V) which is output to a DC+ line and a GND line of the DC plug 11.

The AC/DC conversion circuit 12 has drooping characteristics, and thus an output voltage is reduced if output power exceeds the rated capacity. Since different power specifications have different drooping characteristics even if the AC/DC adaptors have the same rated capacity, power specifications are required to conform in the combination of the AC/DC adaptor and the portable electronic apparatus. For this reason, shapes of the DC plugs 11, 21 and 31 and the dedicated receptacles 13a, 23a and 33a are unique so as not to be connected by other combinations.

The identification resistor R1 has a resistance value for the AC/DC adaptor 10 expressing the rated capacity to the battery unit 100 or the portable electronic apparatus 50 and is connected to an ID1 port of the DC plug 11. The AC/DC adaptor 20 has substantially the same configuration as that of the AC/DC adaptor 10 in relation to the present invention but has a different power specification, and thus there are cases where a value of the identification resistor R1 corresponding to the rated capacity is also different. The ID1 port is not provided in the DC plug 31 of the AC/DC adaptor 30.

C. Configuration of Battery Unit

Figure 3:
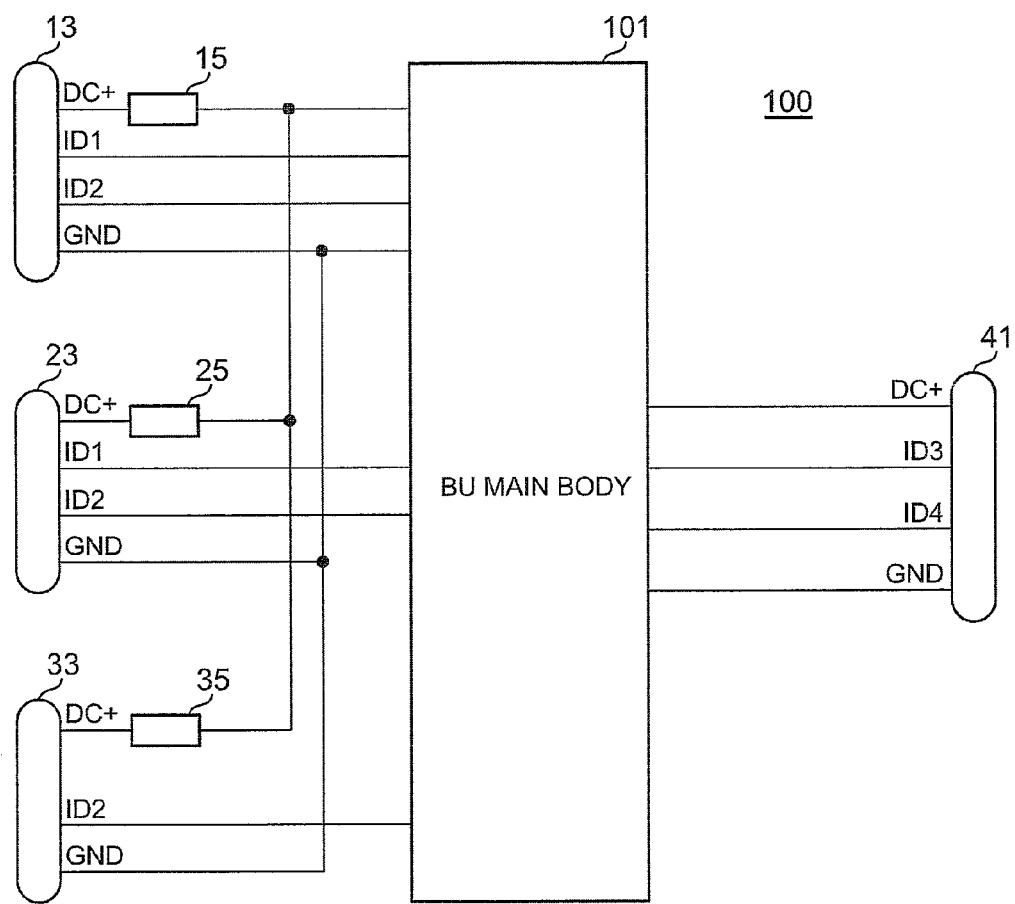
FIG. 3 is a block diagram of a battery unit.

FIG. 3 is a block diagram of the battery unit 100. The battery unit 100 schematically includes the three dedicated receptacles 13, 23 and 33, a singles common receptacle 41, and a main body 101. In the present invention, the number of the dedicated receptacles and the common receptacle 41 is not particularly limited and may be one or more, respectively. Each of the dedicated receptacles 13 and 23 includes a DC+ port, an ID1 port, an ID2 port, and a GND port.

The ID1 port is a port that transmits a signal for recognizing the rated capacities of the AC/DC adaptors 10 and 20. The ID2 port is not a port which is connected to the DC plugs 11, 21 and 31 but a port which is drawn out from the inside so as to identify the dedicated receptacles 13, 23 and 33. The dedicated receptacle 33 includes the DC+ port, the ID2 port, and the GND port.

The DC+ ports of the dedicated receptacles 13, 23 and 33 are connected to each other via switches 15, 25 and 35 constituted by an FET and are connected to the main body 101. The GND ports of the dedicated receptacles 13, 23 and 33 are also connected to each other and are connected to the main body 101. The common receptacle 41 includes the DC+ port, an ID3 port, an ID4 port, and the GND port, which are connected to the main body 101. The ID3 port is a port for expressing the rated capacity to the portable electronic apparatuses 50 and 60 or transmitting information of the battery set 129. The ID4 port is a port for recognizing an identifier of the cable assembly connected to the common receptacle 41 and identifying the rated capacities of the connected portable electronic apparatuses 50, 60 and 70.

Figure 4:
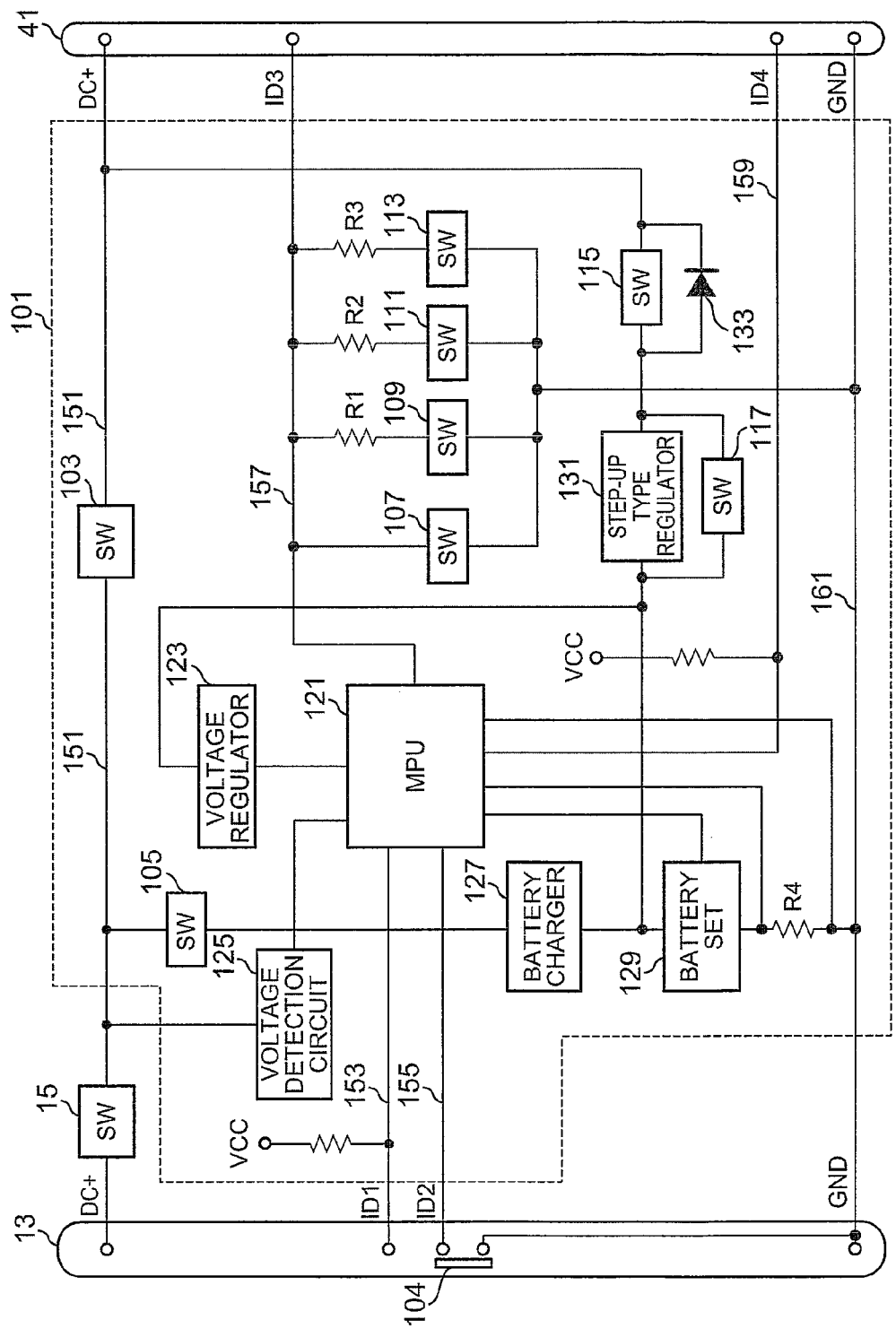
FIG. 4 is a detailed block diagram of the battery unit from FIG. 3.

FIG. 4 is a block diagram of the main body 101 having the battery unit 100. Switches 103, 105, 107, 109, 111, 113, 115 and 117 can be formed by corresponding FETs, and are controlled so as to be turned on and off by an MPU 121. The switches 15, 25 and 35 shown in FIG. 3 are also controlled so as to be turned on and off by the MPU 121. The DC+ port of the dedicated receptacle 13 is connected to the DC+ port of the common receptacle 41 via a DC+ line 151 to which the switches 15 and 103 are connected in series.

The DC+ line 151 constitutes a circuit which supplies power from the AC/DC adaptor to the portable electronic apparatus. A voltage detection circuit 125 is connected to the DC+ line 151 between the switch 15 and the switch 103, and an output thereof is connected to the MPU 121. When detecting that a voltage in a predetermined range having DC 20 V as a reference is applied to the DC+ line 151, the voltage detection circuit 125 outputs a signal to the MPU 121.

An ID1 line 153 connected to the ID1 port of the dedicated receptacle 13 is pulled up by a predetermined voltage and is connected to the MPU 121. When the DC plug 11 is connected to the dedicated receptacle 13, the MPU 121 detects a voltage of the ID1 line 153 divided by the identification resistor R1 of the AC/DC adaptor 10 and recognizes the rated capacity thereof. In the dedicated receptacle 23 as well, the ID1 line is connected to the MPU 121 in this way. Since there is no ID1 line in the dedicated receptacle 33, there is no connection between the ID1 line and the MPU 121.

A mechanical switch 104 which detects insertion of the DC plug 11 is incorporated in the dedicated receptacle 13. The mechanical switch 104 functions as an identifier indicating a dedicated receptacle. One end of the mechanical switch 104 is connected to the MPU 121, and the other end thereof is connected to the GND port of the dedicated receptacle 13.

The mechanical switch 104 is turned on when the DC plug 11 is inserted into the dedicated receptacle 13 so as to enable a potential of the ID2 line to transition. In addition, similarly, the mechanical switch 104 is incorporated into the dedicated receptacles 23 and 33 and each of them is connected to the MPU 121 via the ID2 line 155. The GND port of the dedicated receptacle 13 is connected to the GND port of the common receptacle 41 via a GND line 161.

A battery charger 127, the battery set 129, and a sensor resistor R4 are connected between the DC+ line 151 and the GND line 161 via the switch 105. The battery charger 127 is constituted by a switching regulator and charges the battery set 129 using constant current and constant voltage characteristics. The charging voltage and charging current of the battery charger 127 is set by the MPU 121. The battery set 129 has three lithium ion batteries which are connected in series, and a charging stop voltage is 12.6 V and a discharging stop voltage is 9V. A port on the voltage side of the battery set 129 is connected to a step-up type switching regulator (step-up type regulator) 131 and a voltage regulator 123.

The step-up type regulator 131 superimposes a voltage generated from power accumulated in an inductor on an input voltage, thereby outputting a voltage higher than the input voltage. The step-up type regulator 131 boosts a voltage in a range of at least DC 12.6 V to DC 9V, to DC 20 V which is output. By providing the step-up type regulator 131, the portable electronic apparatus is able to perform the same operation since a voltage applied to the dedicated receptacle and a voltage applied from the AC/DC adaptor conform.

However, if the portable electronic apparatus is able to support low-voltage driving which does not require voltage step-up, power may be supplied from the battery unit 100 in an independent state to the dedicated receptacle 13a with a voltage lower than DC 20 V without providing the step-up type regulator 131. The MPU 121 is able to reduce power consumption by stopping an operation of the step-up type regulator 131 when none of the cable assemblies 51, 53 and 55 is connected to the common receptacle 41 or the portable electronic apparatus is not consuming power.

The step-up type regulator 131 is connected to a bypass switch 117. The bypass switch 117 is provided such that an output voltage of the battery set 129 is output to the DC+ port of the common receptacle 41 even when the battery unit 100 stops an operation of the step-up type regulator 131, and thereby the portable electronic apparatuses 50, 60 and 70 detect that the battery unit 100 in an independent state is connected to the dedicated receptacles 13a, 23a and 33a. In a case where the MPU 121 operates the step-up type regulator 131 at all times when any one of the cable assemblies 51, 53 and 55 is connected to the common receptacle 41, the bypass switch 117 is not required to be provided.

The output of the step-up type regulator 131 is connected to the DC+ port of the common receptacle 41 via the switch 115. The switch 115 is turned on when the battery set 129 is discharged, and is turned off in other states. A diode 133 is connected to both ends of the switch 115. The diode 133 is provided so as to prevent a voltage of the DC+ port from being decreased until the switch 115 is changed to a turned-on state when a power source outputting a voltage to the DC+ port of the common receptacle 41 is changed from the AC/DC adaptor to the battery set 129. A parasitic diode of the switch 115 constituted by an FET may be used instead of the diode 133.

The output of the battery set 129 is connected to the voltage regulator 123 which supplies power to the MPU 121. The voltage regulator 123 converts an output voltage of the battery set 129 into a stable voltage which is suitable for the MPU 121. The ID3 port of the common receptacle 41 is connected to the MPU 121 via an ID3 line 157. Between the ID3 line 157 and the GND port, the switch 107 for communication, the switch 109 for activating the identification resistor R1, the switch 111 for activating an identification resistor R2, the switch 113 for activating an identification resistor R3 are connected. The switches 109, 111 and 113 are controlled by the MPU 121 such that a voltage corresponding to a rated capacity expressed by the battery unit 100 is generated in the ID3 line 157.

The battery unit 100 is able to express three kinds of rated capacities corresponding to the rated capacities of the AC/DC adaptors 10, 20 and 30 connected to the dedicated receptacles 13, 23 and 33 using the identification resistors R1, R2 and R3. As an example, the identification resistors R1, R2 and R3 respectively correspond to the rated capacities 65 W, 90 W and 135 W of the AC/DC adaptors. The number of the identification resistors is not limited to three, and the battery unit 100 may express four or more kinds of rated capacities. At this time, two or more identification resisters may be simultaneously activated so as to create a resistance value different from a case of a single resistor. Methods of expressing a rated capacity include two methods.

A first method is a method in which the MPU 121 detects the ID2 line 155, any one of the identification resistors R1, R2 and R3 corresponding to a recognized rated capacity via the ID1 line 153 is activated when it is recognized that the AC/DC adaptors 10 and 20 are connected to either of the dedicated receptacles 13 and 23, and the identification resistor R1 corresponding to the lowest rated capacity is activated when it is recognized that the AC/DC adaptor 30 is connected to the dedicated receptacle 33. This method is preferable since the portable electronic apparatus consumes power up to a rated capacity of the AC/DC adaptor connected to the battery unit 100.

However, in this case, when the battery unit 100 expresses a large rated capacity and then reaches an independent state, the portable electronic apparatus consumes large power as it is. A typical portable electronic apparatus is operated in a lower power mode when a battery is operated by reducing power consumption than when power is supplied from the AC/DC adaptor, thereby extending the battery operation time. Similarly to this method, in the first method as well, in order to extend the battery operation time by the battery unit 100, it is necessary for the AC/DC adaptor to detect that power stops being supplied and to notify the portable electronic apparatus of the lowest rated capacity.

In addition, in order that the portable electronic apparatus is able to reduce power consumption in a short time, it is necessary to finish communication between the battery unit 100 and the portable electronic apparatus in a short time. In the present embodiment, a single wire bus scheme using the existing ID3 port is employed such that communication between the battery unit 100 and the portable electronic apparatus is performed without increasing of the number of ports of the dedicated receptacles 13a, 23a and 33a or building a new communication line. Since it is not easy to stably perform complicate communication in a short time in the single wire bus scheme, the first method is required to be selected in consideration of this fact. In addition, the present invention is not limited to the single wire bus scheme, and thus the first method is advantageous in a case where complicate communication is able to be easily performed by adding a clock line such as an SM bus.

A second method is a method in which the identification resistor R1 corresponding to the lowest rated capacity is activated at all times even if the AC/DC adaptors 10, 20 and 30 of any rated capacity are connected to any one of the dedicated receptacles 13, 23 and 33. In this case, the portable electronic apparatus cannot sufficiently utilize a rated capacity of the AC/DC adaptor which is actually connected; however, even when the battery unit 100 is in an independent state, the portable electronic apparatus performs power management corresponding thereto. In addition, this method is able to be easily realized even in the single wire bus scheme since it is not necessary to express the lowest rated capacity by recognizing the dedicated receptacles 13, 23 and 33 to which the AC/DC adaptor is connected or detecting that the AC/DC adaptor stops supplying power. The second method may be referred to as a method in which a portable electronic apparatus recognizes the battery unit as a battery set of the lowest rated capacity in any state of the adaptor connection state and the independent state, and performs power management corresponding thereto.

The ID4 port of the common receptacle 41 is connected to the MPU 121 via an ID4 line 159. The ID4 line is provided such that the MPU 121 identifies identifiers of the cable assemblies 51, 53 and 55 connected to the common receptacle 41. The MPU 121 is able to recognize the power specification of the portable electronic apparatus connected to the battery unit 100 via the ID4 line 159. The MPU 121 controls operations of the battery charger 127, the step-up type regulator 131, the switch 15, and the switches 103 to 117.

The MPU 121 calculates a remaining capacity, a charge-discharge cycle, a full charge capacity, and the like from a voltage of the sensor resistor R4 and a cell voltage of the battery set 129. The MPU 121 communicates with the portable electronic apparatus via the ID3 line in the single wire bus scheme, expresses that a power source connected to the dedicated receptacles 13a and 23a is the battery unit 100, and notifies of a rated capacity, a remaining capacity, deterioration information, and the like.

D. Portable Electronic Apparatus

Figure 5:
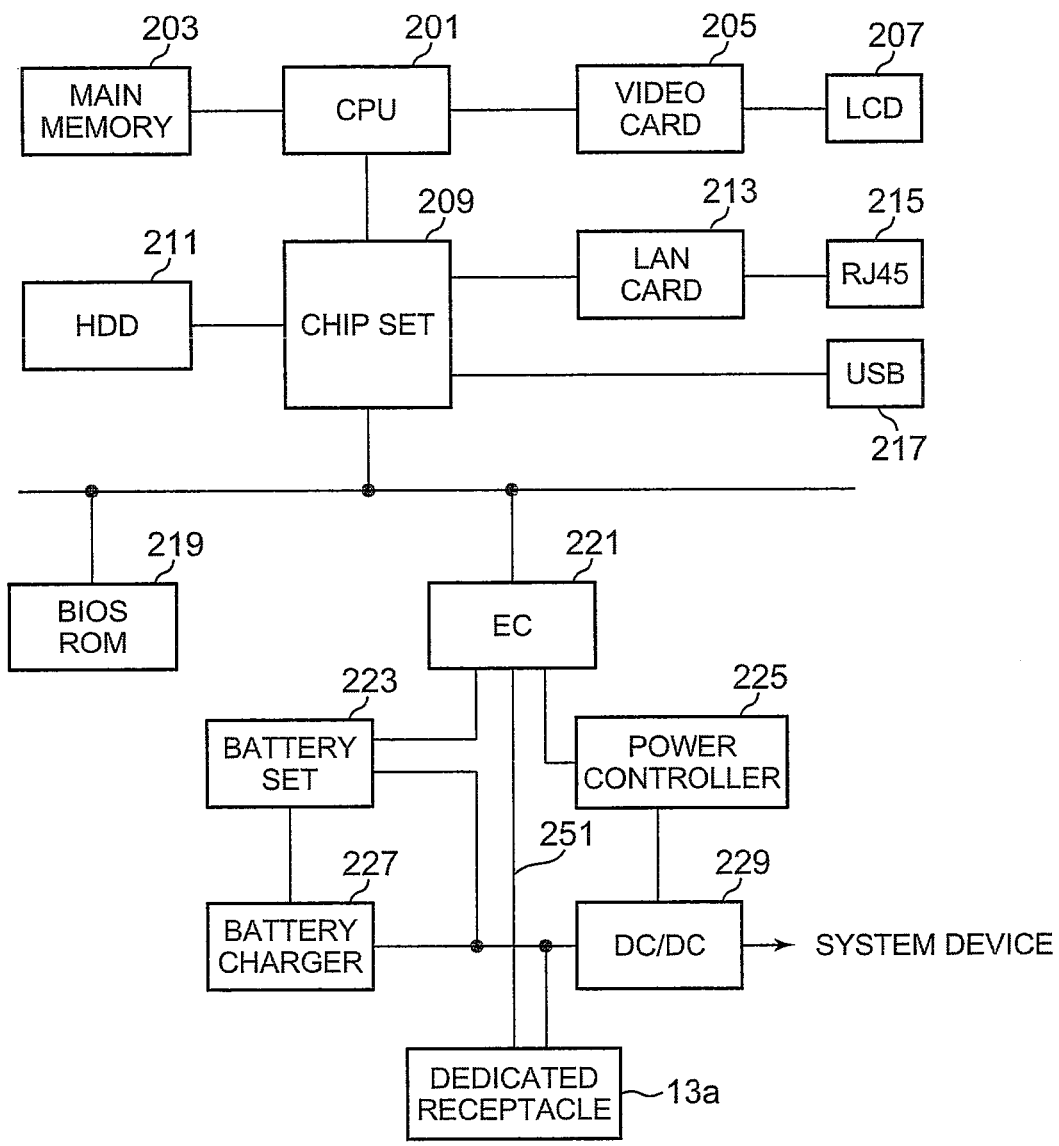
FIG. 5 is a block diagram of a laptop PC.

FIG. 5 is a block diagram of the laptop PC 50 as an example of the portable electronic apparatus 50. A CPU 201 has a memory controller and a PCI Express controller embedded therein and is connected to a main memory 203, a video card 205, and a chip set 209. The video card 205 is connected to an LCD 207. The chip set 209 has controllers such as SATA, USB, PCI Express, LPC, and the like, and RTC (Real Time Clock) embedded therein.

The SATA controller is connected to an HDD 211, the PCI Express controller is connected to a LAN card 213, and the USB controller is connected to a USB receptacle 217. The LAN card 213 is connected to an RJ45 receptacle 215. The LPC controller is connected to a BIOS_ROM 219 and an embedded controller (EC) 221.

The BIOS_ROM 219 is a nonvolatile memory which is able to electrically rewrite storage content, and stores programs such as POST (Power-On Self Test) for performing test and initialization of hardware at the time of activation, ACPI BIOS for managing basic input and output to and from a device, a power source, and temperature inside the casing, and a password authentication code for requesting a user to perform password authentication.

The EC 221 is a microcomputer constituted by a CPU, a ROM, a RAM, and the like, and further includes A/D input ports and D/A output ports of a set of channels, a timer, and digital input and output ports. The EC 221 is able to execute a program regarding management of operation circumstances of the inside of the laptop PC 50 independently from the CPU 201. The EC 221 is connected to the dedicated receptacle 13a via an ID3 line 251.

The EC 221 monitors a state of a battery set 223 and controls an operation of a battery charger 227. The battery set 223 fits the smart battery system (SBS) specification, and is mounted inside the casing in a form of not being exchangeable by a user. The EC 221 sets a set value of charging current and a set value of charging voltage of the battery set 223 in the battery charger 227. The battery charger 227 charges the battery set 223 in a constant current and constant voltage control method (CCCV) on the basis of the set value of charging current and the set value of charging voltage set by the EC 221.

The EC 221 controls a DC/DC converter 229 via a power controller 225, and supplies power to a system device mounted in the laptop PC 50. The power controller 225 is connected to the EC 221 and the DC/DC converter 229 and controls the DC/DC converter 229 on the basis of an instruction from the EC 221. The DC/DC converter 229 converts a DC voltage supplied from the battery unit 100 or the AC/DC adaptor 10 connected to the dedicated receptacle 13a, or the battery set 223, into different voltages, and supplies power to the system device.

The dedicated receptacle 13a is connected to the battery unit 100 in an adaptor connection state or an independent state, or the AC/DC adaptor 10. The battery unit 100 or the AC/DC adaptor 10 connected to the dedicated receptacle 13a supplies power to the DC/DC converter 229 and the battery charger 227. The EC 221 recognizes which one of the battery unit 100 and the AC/DC adaptor 10 is connected to the dedicated receptacle 13a using a method described later. When it is recognized that the battery unit 100 is connected to the dedicated receptacle 13a, the EC 221 may stop charging of the battery set 223 by the battery charger 227.

E. Management of Battery Unit by Laptop PC

Either of the AC/DC adaptor 10 and the battery unit 100 is connected to the dedicated receptacle 13a, but a shape of the DC plug 11 of the AC/DC adaptor 10 is the same as in the related art. There is a number of rated capacities of the AC/DC adaptor 10 that is able to be connected to the dedicated receptacle 13a, but an AC/DC adaptor of which an output voltage is not DC 20 V cannot be connected to the dedicated receptacle 13a by the shapes of the DC plug 11 and the dedicated receptacle 13a.

The rated capacity of the AC/DC adaptor 10 is larger than the maximum system power consumption obtained by summing power consumption of the system device of the laptop PC 50 but is smaller than the total maximum power consumption obtained by adding charging power of the battery charger 227 thereto. Therefore, the laptop PC 50 performs power management such that the total maximum power consumption does not exceed the rated capacity of the AC/DC adaptor 10. The power management is typically performed by controlling the battery charger 227 such that a difference between the rated capacity of the AC/DC adaptor 10 and the system power consumption is used for the charging power in a preferential manner of a performance of the system.

In a case where the AC/DC adaptor 10 of which the rated capacity is smaller than the maximum system power consumption is connected, the laptop PC 50 is required to reduce system power consumption by reducing a clock frequency of the CPU 201 or the video card 205 or reducing the luminance of the LCD 207, and thereby a performance of the system is lowered or charging cannot be performed. In a case where the AC/DC adaptor 10 of which the rated capacity is larger than the total maximum power consumption is connected, the laptop PC 50 is not required to perform the power management.

When the AC/DC adaptor 10 or the battery unit 100 is connected to the dedicated receptacle 13a, the laptop PC 50 is required to recognize such a rated capacity in order to perform the power management. The laptop PC 50 recognizes which one of the AC/DC adaptor 10 and the battery unit 100 is connected. In addition, when it is recognized that the battery unit 100 is connected, the laptop PC 50 acquires a remaining capacity and deterioration information of the battery set 129 in the same manner as the battery set 223, and manages the battery set 129 by displaying the information on the LCD 207 or performs the power management.

In order to perform the power management or manage the battery set 129, in the present embodiment, the laptop PC 50 and the battery unit 100 perform communication in the single wire bus scheme via the cable assembly 51. Among the various features of the present invention, the communication of the single wire bus scheme is advantageous in that backward compatibility is able to be secured or costs are able to be reduced since modifications in the existing laptop PC 50 are few, and the other features are able to be realized even employing other communication schemes using clocks.

Figure 6:
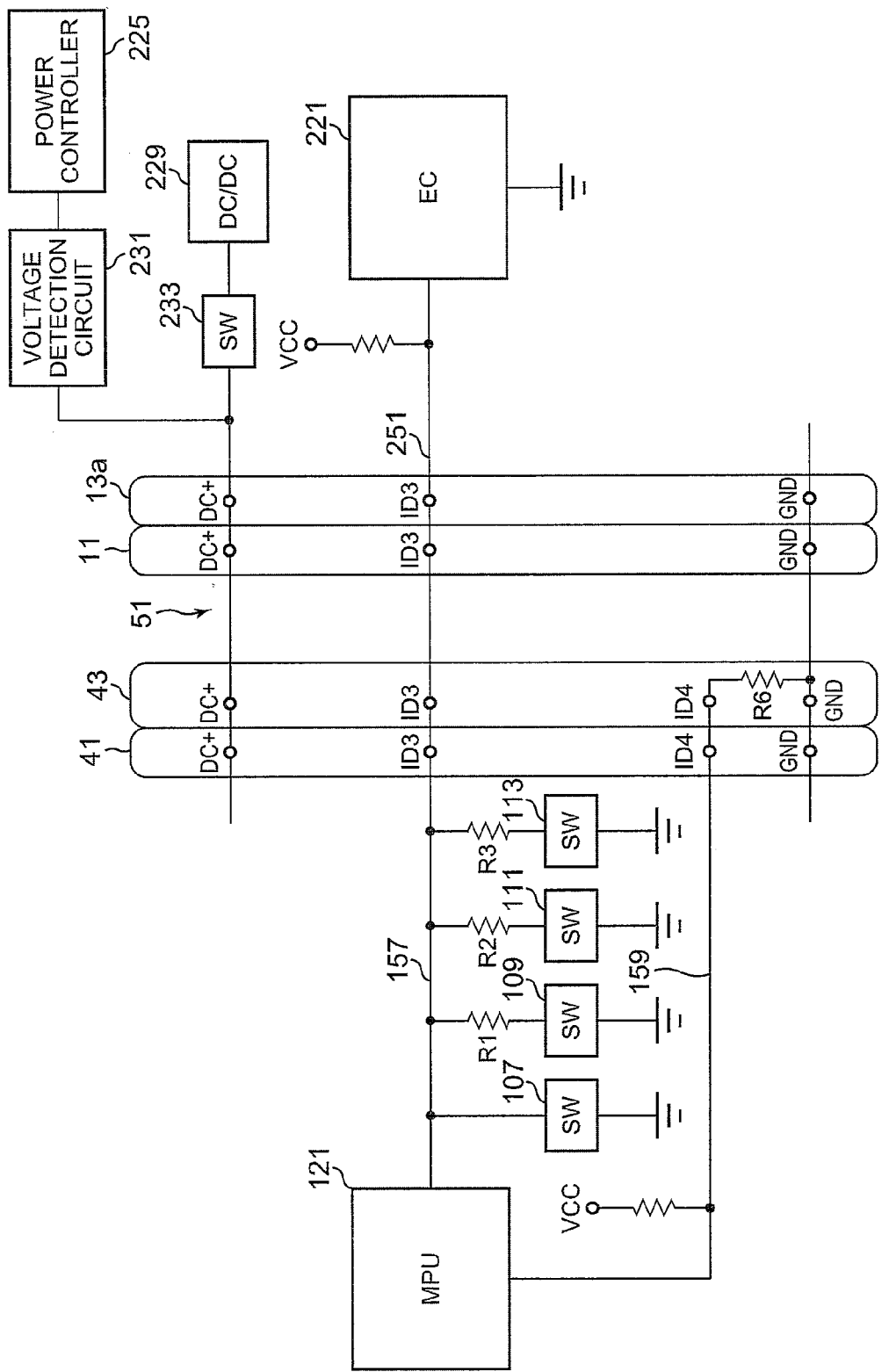
FIG. 6 is a diagram illustrating a laptop PC being connected to a battery unit via a cable assembly.

FIG. 6 is a diagram illustrating a state where the laptop PC 50 is connected to the battery unit 100 via the cable assembly 51. In the cable assembly 51, an identification resistor R6 is connected between the ID4 port and the GND port of the DC plug 43. The identification resistor R6 corresponds to an identifier of the cable assembly 51 connected to the common receptacle 41. The MPU 121 detects a voltage of the ID4 line 159 divided by the identification resistor R6 and thereby detects that not the cable assemblies 53 and 55 but the cable assembly 51 is connected to the common receptacle.

The cable assemblies 51, 53 and 55 are uniquely correlated with the portable electronic apparatuses 50, 60 and 70 depending on the specifications of the DC plugs 11a, 21a and 31a and the dedicated receptacles 13a, 23a and 33a. In addition, the cable assemblies 53 and 55 include identification resistors R6 which have a resistance value different from that of the identification resistor R6 and have resistance values different from each other. Therefore, the MPU 121 is able to recognize which portable electronic apparatus is connected to the common receptacle 41 using the identification resistor R6.

A voltage detection circuit 231 is connected between the DC+ port of the dedicated receptacle 13a and the switch 233. The voltage detection circuit 231 outputs a detection signal when a voltage in a predetermined range having DC 20 V as a reference is detected. An output of the voltage detection circuit 231 is connected to the power controller 225. The switch 233 is constituted by an FET and controls supply of power to the DC/DC converter 229 from the dedicated receptacle 13a. The switch 233 is controlled by the power controller 225 so as to be turned on when a voltage of DC 20 V is applied to the DC+ port, and to be turned off when the voltage is lost.

In addition, FIGS. 1-6 show the main hardware configuration and connection relationship related to the present embodiment through simplification in order to describe the present embodiment. In addition to the constituent elements described hitherto, many devices are used to configure the battery unit 100, the AC/DC adaptor 10, and the laptop PC 50. However, the devices are well-known to a person skilled in the art and thus a detailed description thereof will be omitted.

To configure the multiple blocks shown in the drawings as a single integrated circuit or device, or, conversely, to configure a single block as a set of integrated circuits or devices through division are also included in the scope of the present invention in a range capable of being selected by a person skilled in the art as desired. The kinds of buses and interfaces for connecting the devices to each other are only an example, and other connections are included in the scope of the present invention in a range capable of being selected by a person skilled in the art as desired.

F. Operation Procedure of Battery Unit in Adaptor Connection State

Figure 7:
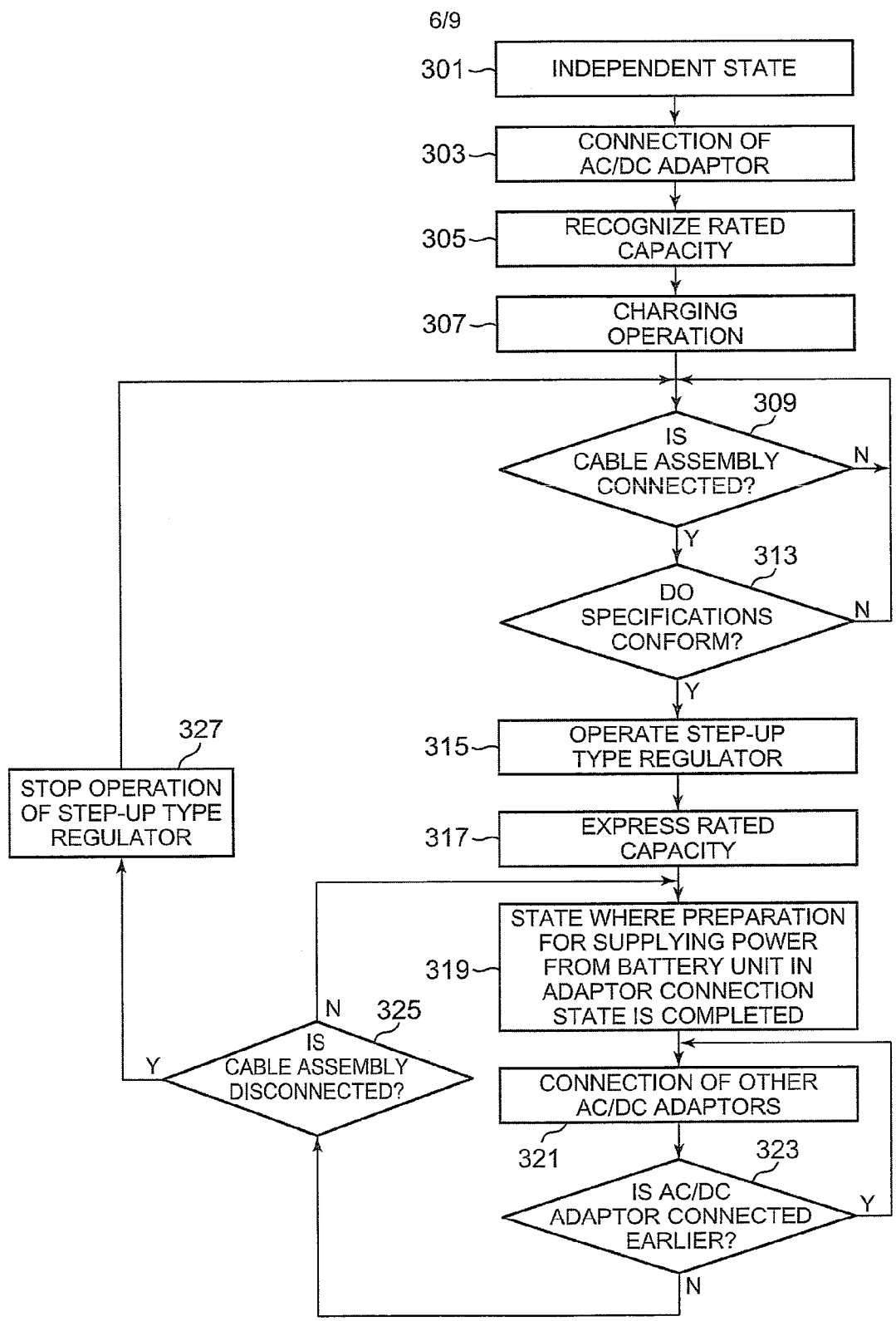
FIG. 7 is a flowchart illustrating an operation procedure when an AC/DC adaptor and a cable assembly are connected to a battery unit in an independent state so as to transition to an adaptor connection state.

FIG. 7 is a flowchart illustrating an operation procedure when the AC/DC adaptor and the cable assembly are connected to the battery unit 100 in an independent state. In block 301, the AC/DC adaptors 10, 20 and 30 are not connected to any of the dedicated receptacles 13, 23 and 33, and the battery unit 100 is in an independent state. In addition, none of the cable assemblies 51, 53 and 55 is connected to the common receptacle 41. The MPU 121 is operated by power supplied from the battery set 129 and controls an internal operation.

The MPU 121 recognizes that the battery unit 100 is in an independent state via the ID2 line 155 of each of the dedicated receptacles 13, 23 and 33, and turns off all of the switches 15, 25, 35, 103, 105, 107, 109, 111, 113, 115 and 117 by recognizing that none of the cable assemblies 51, 53 and 55 is connected via the ID4 line 159 of the common receptacle 41. The MPU 121 further recognizes that none of the cable assemblies 51, 53 and 55 is connected, and reduces power consumption by stopping an operation of the step-up type regulator 131.

Therefore, the battery unit 100 in an independent state does not output a voltage of DC 20 V to the common receptacle 41 when none of the cable assemblies is connected. In block 303, the MPU 121 detects that the AC/DC adaptors 10, 20 and 30 are connected to any one of the dedicated receptacles 13, 23 and 33, through an operation of the mechanical switch 104. Here, a description will be made based on a case where the AC/DC adaptor 10 is connected to the dedicated receptacle 13, and an operation is performed in the same procedure in a case where the AC/DC adaptor 20 is connected as well. In a case where the AC/DC adaptor 30 is connected, there is no ID1 line 153 in the dedicated receptacle 33, and thus a more or less different operation will be performed and appropriately described.

The MPU 121 which recognizes that the AC/DC adaptor 10 is connected turns on the switch 15. In block 305, the MPU 121 detects a voltage of the ID1 line 153 of the dedicated receptacle 13 divided by the identification resistor R1 of the AC/DC adaptor 10, and recognizes the rated capacity of the AC/DC adaptor 10 connected to the dedicated receptacle 13. When the AC/DC adaptor 30 is connected to the dedicated receptacle 33, this procedure is omitted.

In block 307, the MPU 121 which detects that a voltage is applied to the DC+ line 151 using an output of the voltage detection circuit 125 turns on the switch 105, and starts charging of the battery set 129 by setting charging current and charging voltage in the battery charger 127 as necessary. Thereafter, the MPU 121 sets the charging voltage and the charging current so as to control charging power in a power range of a difference between the rated capacity of the connected AC/DC adaptor 10 and the power output from the common receptacle 41. When it is recognized that the AC/DC adaptor 30 is connected to the dedicated receptacle 33, the MPU 121 sets the charging voltage and the charging current so as to control charging power in a power range of a difference between the lowest rated capacity and the power output from the common receptacle 41.

Furthermore, the MPU 121 calculates a remaining capacity, a full charge capacity, and a charge and discharge cycle of the battery set 129. In block 309, the MPU 121 detects a voltage of the ID4 line 159, and recognizes connection of any one of the cable assemblies 51, 53 and 55 is to the common receptacle 41, and an identifier of the connected cable assembly. When the MPU 121 recognizes that none of the cable assemblies 51, 53 and 55 is connected, the procedure does not proceed any more.

In block 313, the power specification of the laptop PC 50 which is determined through the ID4 line 159 indicating the connected cable assembly 51 is compared with the power specification of the AC/DC adaptor 10 which is determined through the dedicated receptacle 13 indicated by the ID2 line 155. In a case where the cable assemblies 53 and 55 are connected, the power specification of the AC/DC adaptor 10 does not conform to the power specification of the portable electronic apparatuses 60 and 70, and thus the procedure returns to block 309 and does not proceed any more. As long as the power specifications do not conform, power is not supplied from the AC/DC adaptor 10 to the portable electronic apparatuses 60 and 70 via the battery unit 100, but power is supplied to the battery charger 127 so as to charge the battery set 129.

When the cable assembly 51 is connected to the common receptacle 41, the power specifications of the AC/DC adaptor 10 and the laptop PC 50 conform. If it is determined that the power specification of the AC/DC adaptor 10 conforms to the power specification of the laptop PC 50 correlated with the cable assembly 51, the MPU 121 operates the step-up type regulator 131 is block 315. At this moment, it is unclear whether or not the portable electronic apparatus 50 is connected to the cable assembly 51, and whether or not the connected portable electronic apparatus 50 consumes power. Therefore, there are cases of a state where the laptop PC 50 is not connected or a state where the laptop PC 50 is connected but is powered off.

Although power loss occurs due to the operation of the step-up type regulator 131, the reason why the step-up type regulator 131 is operated at a timing when the cable assembly 51 is connected before the laptop PC 50 actually consumes power is as follows. When the AC/DC adaptor 10 is connected to the dedicated receptacle 13a, an existing laptop PC detects connection of the AC/DC adaptor 10 by the voltage detection circuit 231 detecting DC 20 V, and operates the power controller 225.

The laptop PC 50 detects connection of the battery unit 100 in the same manner, and the EC 221 is required to start communication with the MPU 121. If the step-up type regulator 131 is stopped, the battery unit 100 in an independent state outputs a voltage of DC 9V to DC 12.6 V to the common receptacle 41. However, since the voltage detection circuit 231 of the existing laptop PC cannot detect the voltage of DC 9 V to DC 12.6 V, when the battery unit 100 in an independent state is connected to the laptop PC 50, the step-up type regulator 131 is required to be operated in advance, and thereby the battery unit is able to be operated through detection of the connection thereof.

In contrast, there is a method in which the EC 221 detects a voltage of the ID3 lines 157 and 251 which is pulled up on the battery unit 100 side, and thereby connection of the AC/DC adaptor 10 or the battery unit 100 is detected; however, in this case, power is required to be supplied to the EC 221 in a power-off state, and thus power loss occurs. In addition, in this method, the portable electronic apparatus 70 having the dedicated receptacle 33a of the two-port structure cannot detect connection of the AC/DC adaptor 30 or the battery unit 100.

However, if the voltage detection circuit 231 of all the portable electronic apparatuses using the battery unit 100 is able to detect a voltage in a wide range of DC 9V to DC 20V, the bypass switch 117 provided in the step-up type regulator 131 is turned on when the step-up type regulator 131 is stopped, and thereby a communication process between the EC 221 and the MPU 121 is able to be started. In this case, while the laptop PC 50 is not consuming power, the step-up type regulator 131 is made to be stopped, and the MPU 121 detects that the laptop PC 50 consumes power, thereby operating the step-up type regulator 131.

Next, in block 317, the MPU 121 turns on any one of the corresponding switches 109, 111 and 113 in order to activate any one of the identification resistors R1, R2 and R3 using either of the first method and the second method. Here, the second method is employed, and the MPU 121 turns on only the switch 109 in order to activate the identification resistor R1 corresponding to the lowest rated capacity. As a result, the battery unit 100 expresses the lowest rated capacity to the laptop PC 50 regardless of a value of the rated capacity of the connected AC/DC adaptor 10.

In block 319, the MPU 121 turns on the switch 103. As a result, a voltage of DC 20 V is output to the DC+ port of the common receptacle 41, and thereby there is a completion of a state where power is supplied to the portable electronic apparatus 50 connected to the DC plug 11a of the cable assembly 51. A voltage of the step-up type regulator 131 is set such that power is supplied from the AC/DC adaptor 10 when the portable electronic apparatus 50 is connected to the common receptacle 41. The MPU 121 stops an operation of the step-up type regulator 131 in an adaptor connection state, and operates the step-up type regulator 131 when the battery unit 100 is transferred to an independent state, such that the switch 103 is controlled so as to be turned off and the switch 105 is controlled so as to be turned on.

In block 321, the AC/DC adaptor 20 is connected to the dedicated receptacle 23 in an adaptor connection state to which is the AC/DC adaptor 10 is connected. If it is detected that the new AC/DC adaptor 20 is detected through the ID2 line of the dedicated receptacle 23, the MPU 121 determines whether or not the AC/DC adaptor is connected to the dedicated receptacle earlier than the new AC/DC adaptor in block 323. For example, if it is determined that the AC/DC adaptor 10 is connected to the dedicated receptacle 13 earlier, the switch 25 is maintained to be turned off such that the AC/DC adaptors are not connected in parallel.

In block 325, the cable assembly 51 is released from the battery unit 100 in an adaptor connection state. If it is detected that the cable assembly 51 is released through the ID4 line, the MPU 121 stops an operation of the step-up type regulator 131 in block 327 and returns to block 309. Therefore, when none of the cable assemblies 51, 53 and 55 is connected to the common receptacle 41, it is possible to reduce power loss of the step-up type regulator 131.

Figure 8:
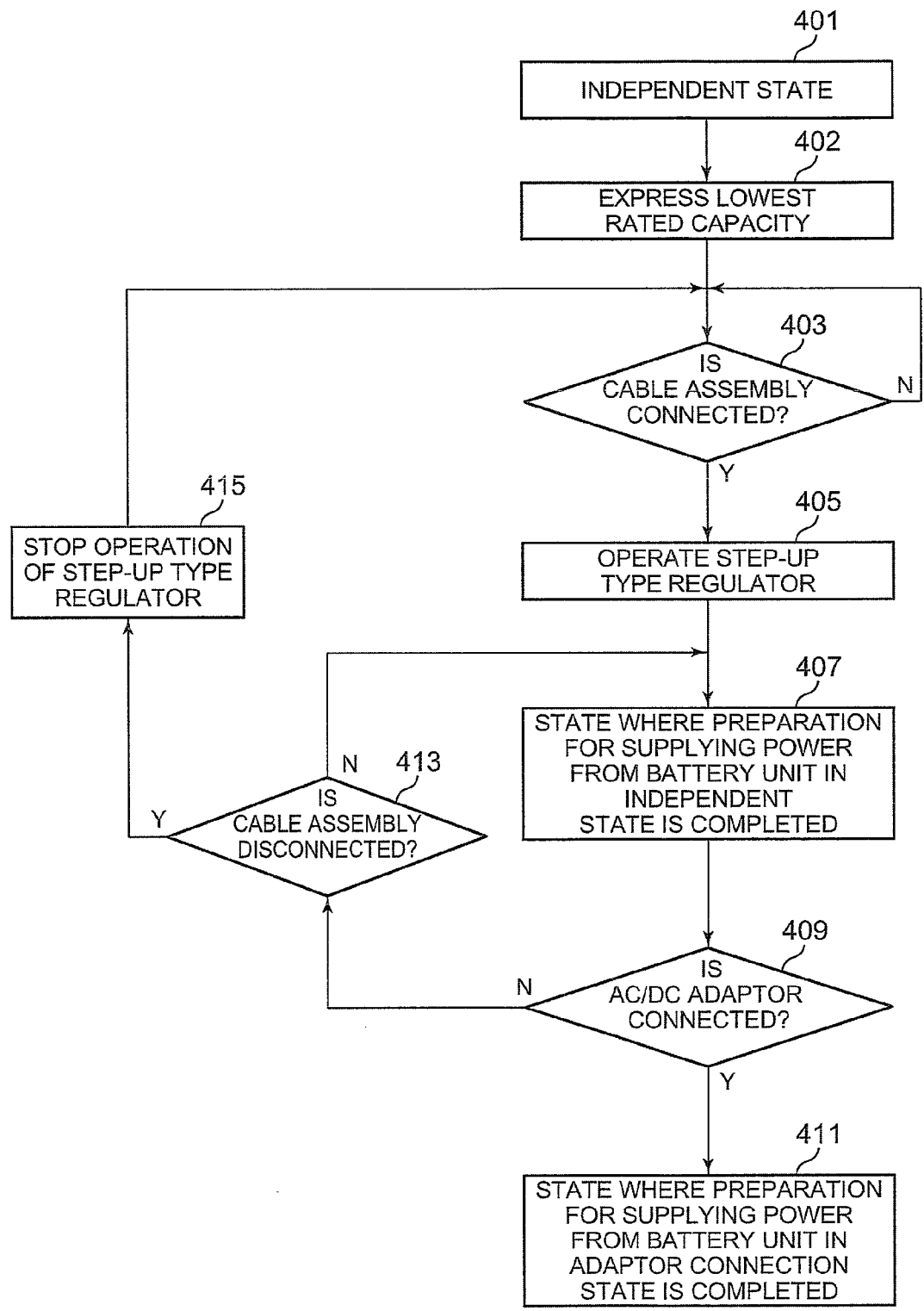
FIG. 8 is a flowchart illustrating an operation procedure when a cable assembly being connected to a battery unit in an independent state.

FIG. 8 is flowchart illustrating an operation procedure when the cable assemblies are connected to the battery unit 100 in an independent state. In block 401, the battery unit 100 is in an independent state in the same manner as block 301. In block 402, when the independent state is recognized through the ID2 line 155 of each of the dedicated receptacles 13, 23 and 33, the MPU 121 turns on only the switch 109 and there expresses the lowest rated capacity. In block 403, the MPU 121 detects that any one of the cable assemblies 51, 53 and 55 is connected to the common receptacle 41 through the ID4 line 159. If it is recognized that any one of the cable assemblies 51, 53 and 55 is connected, the MPU 121 operates the step-up type regulator 131 in block 405.

In block 407, when the MPU 121 turns on the switch 115, a voltage of DC 20 V is output to the common receptacle 41, and the battery unit 100 completes a preparation for supplying power to any one of the portable electronic apparatuses 50, 60 and 70 from the battery set 129. Block 409 indicates a state where any one of the AC/DC adaptors 10, 20 and 30 is connected to the battery unit 100 in an independent state thereafter.

If any one of the AC/DC adaptors 10, 20 and 30 is connected, in block 411, the procedures in blocks 303, 305, 307 and 317 of FIG. 7 are executed and transition to the state of block 319. At this time, the MPU 121 may stop an operation of the step-up type regulator 131. The battery unit 100 in an independent state may supply power without determining the power specifications of the AC/DC adaptor and the portable electronic apparatus.

In block 413, the cable assembly 51 is released from the battery unit 100 in an independent state. If it is detected that the cable assembly 51 is released through the ID4 line, the MPU 121 stops an operation of the step-up type regulator 131 in block 415 and returns to block 403. Therefore, when none of the cable assemblies 51, 53 and 55 is connected to the common receptacle 41, it is possible to suppress discharging of the battery set 129 by stopping an operation of the step-up type regulator 131.

G. Operation Procedure when Power is Supplied from Battery Unit to Laptop PC

Figure 9:
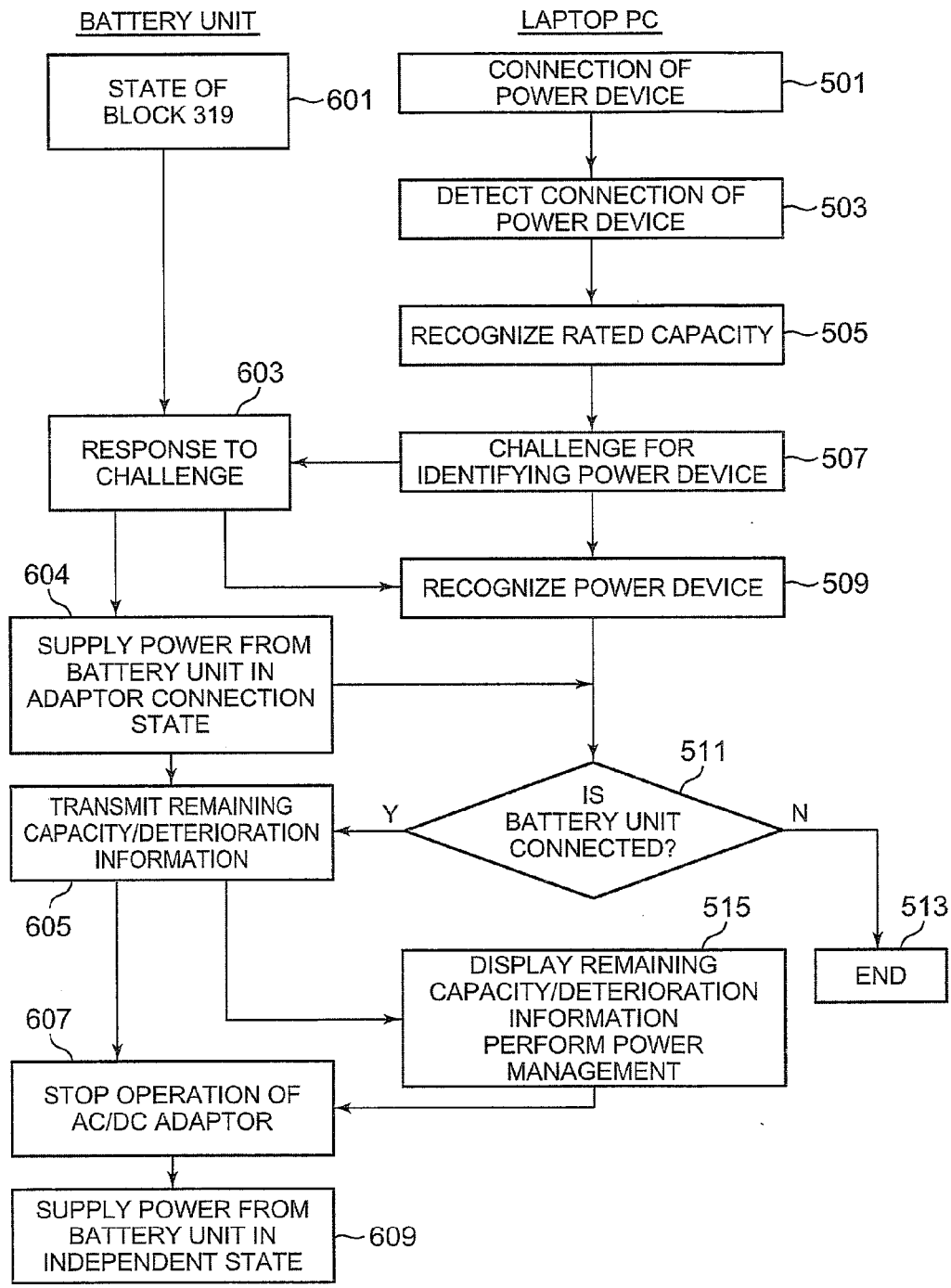
FIG. 9 is a flowchart illustrating an operation procedure when power is supplied from a battery unit in an adaptor connection state to a laptop PC.
Figure 10A:
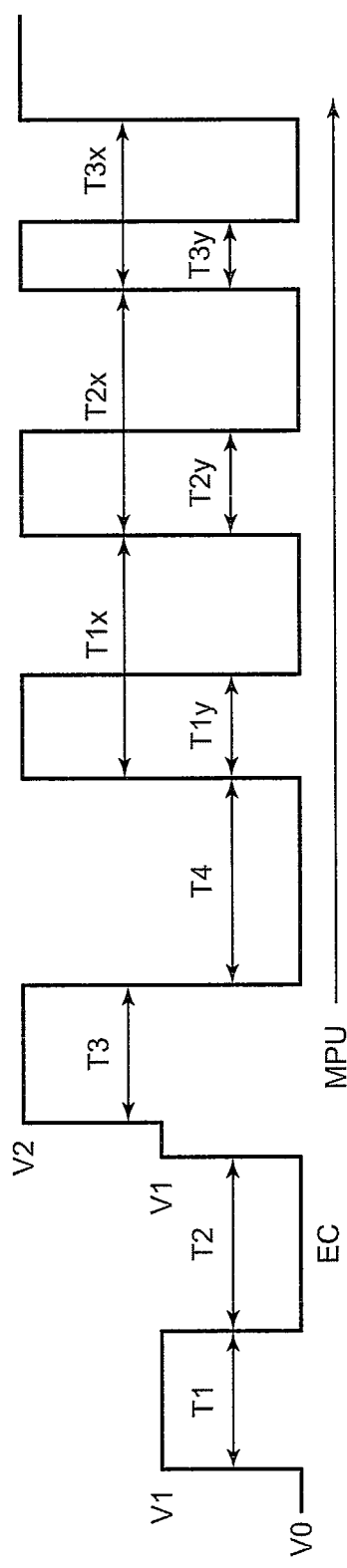
FIGS. 10A-10B are diagrams illustrating a protocol when an EC and an MPU communicate with each other in a single-wire bus scheme.
Figure 10B:
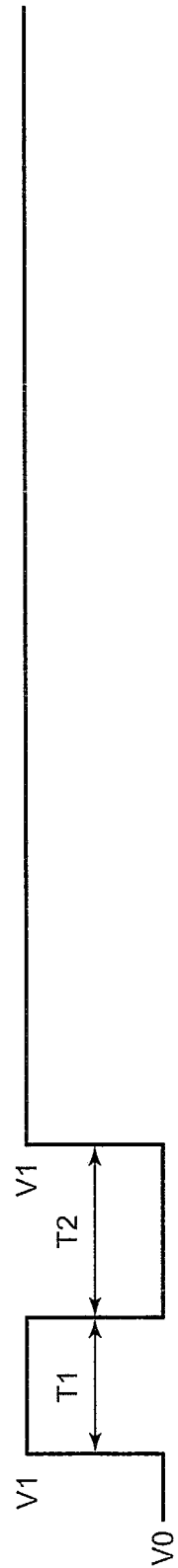

Next, with reference to the flowchart of FIG. 9, a description will be made of an operation procedure when power is supplied from the battery unit 100 in an adaptor connection state to the laptop PC 50. FIGS. 10A and 10B are diagrams illustrating a protocol when the EC 221 and the MPU 121 communicate with each other in the single wire bus scheme. FIG. 10A shows a voltage of the ID3 lines 251 and 157 when the battery unit 100 is connected to the dedicated receptacle 13a, and FIG. 10B shows a voltage of the ID3 line 251 when the AC/DC adaptor 10 is connected to the dedicated receptacle 13a.

Since only the battery set 223 is a power source, the laptop PC 50 transitions a power-on state or a power-off state. Here, a description will be made on the premise of a power-off state. In a power-off state, the DC/DC converter 229 supplies power which is minimally necessary for transition to a power-on state to the power controller 225. In addition, the switch 233 is turned off, and the EC 221 stops being operated.

The battery unit 100 transitions to the state of block 319 of FIG. 7 or the state of block 411 of FIG. 8, and only the switch 109 is turned on among the switches 107, 109, 111 and 113, thereby expressing the lowest rated capacity. In block 501, the AC/DC adaptor 10 or the battery unit 100 (hereinafter, referred to as a power device) which transitions to the state of block 319 of FIG. 7 is connected to the dedicated receptacle 13a of the laptop PC 50. Even in a case where any power device of the AC/DC adaptor 10 or the battery unit 100 is connected, in block 503, the voltage detection circuit 231 detects a voltage of the DC+ port of the dedicated receptacle 13a so as to be output to the power controller 225. The power controller 225 controls the DC/DC converter 229 such that power is supplied in a range which is necessary for the EC 221 to recognize the rated capacity of the battery unit 100 or the AC/DC adaptor 10 or to communicate with the MPU 121.

In block 505, the EC 221 detects a voltage V1 of the ID3 line 251 which is divided by the identification resistor R of the AC/DC adaptor 10 or the battery unit 100 during time T1 and thereby recognizes a rated capacity expressed by the power device. The EC 221 may recognize the rated capacity of the connected power device as the lowest rated capacity in a case where the voltage V1 is out of a voltage range existing in a list thereof.

If the laptop PC 50 cannot perform power management within the lowest rated capacity, the switch 233 may be maintained to be turned off, and power may not be received from the power device expressing the lowest rated capacity. In this case, the laptop PC 50 is operated using only power of the battery set 223, and automatically transitions to a hibernation state or a stopping state when a remaining capacity of the battery set 223 is reduced. At this moment, the EC 221 does not recognize that either of the AC/DC adaptor 10 and the battery unit 100 is connected.

In addition, in a case where the recognized rated capacity of the power device exceeds a maximum value of power for which power management is able to be performed, the laptop PC 50 performs power management for power for which the power management is able to be performed. Therefore, in a case where the laptop PC 50 is able to perform power management up to the AC/DC adaptor 10 of the rated capacity 90 W, power consumption is controlled within 90 W even if the AC/DC adaptor 10 of the rated capacity 135 W is connected. A difference between the rated capacity of the AC/DC adaptor and the total maximum power consumption of the laptop PC 50 is used to charge the battery set 129.

In block 507, the EC 221 performs a challenge for recognizing which power device is connected to the dedicated receptacle 13a with respect to the AC/DC adaptor 10 or the battery unit 100. The EC 221 enables the ID3 line 251 to transition to a low level (voltage V0) and then to return to the voltage V1 during the time T2 after the time T1 has elapsed. Here, when the battery unit 100 is connected to the dedicated receptacle 13a, in block 603, the challenged MPU 121 turns off the switch 109 after the ID3 line 157 returns to the voltage V1, and opens the ID3 line 251 for communication. As a result, a voltage of the ID3 line 157 transitions to a voltage V2 set by an internal resistor of the MPU 121.

Next, the MPU 121 turns on the switch 107 after the time T3 has elapsed and enables a voltage of the ID3 line 157 to transition to the voltage V0 during the time T4. When the AC/DC adaptor 10 is connected to the dedicated receptacle 13a, there is no response to the challenge by the EC 221, and thus the ID3 line 251 maintains the voltage V1 which is returned by the EC 221 after the time T2.

In block 509, the EC 221 monitors a response to the challenge using a voltage of the ID3 line and recognizes which one of the battery unit 100 or the AC/DC adaptor 10 is the connected power device. If the kind of power device and the rated capacity are recognized, the EC 221 controls the switch 233 so as to be turned on, and power is supplied from any one power device to the DC/DC converter 229 and the battery charger 227. In a case where the device is the battery unit 100, in block 604, power is supplied from the battery unit 100 in an adaptor connection state to the laptop PC 50.

In block 511, in a case where the EC 221 recognizes that the AC/DC adaptor 10 is connected, a transition to block 513 is made, and then the operation procedure according to the present embodiment finishes. In a case where it is determined that the battery unit 100 is connected, the laptop PC 50 is able to be operated in a low power mode by reducing a clock frequency of the CPU 201 or lowering the luminance of the LCD 207 as compared with a case where it is determined that the AC/DC adaptor 10 is connected.

In block 605, the MPU 121 which has responded to the challenge transmits a remaining capacity (RSOC: Relative State Of Charge) relative to the full charge capacity and deterioration information indicating a progress extent of deterioration of the battery set 129 to the EC 221 via the ID3 line 157 after the time T4 has elapsed. The deterioration information is a value correlated with the charge and discharge cycle or a value correlated with a ratio of the present full charge capacity to the rated capacity. The MPU 121 may transmit the deterioration progress extent which is divided into several levels.

The MPU 121 controls the switch 107 so as to transmit the remaining capacity and the deterioration information together by enabling a voltage of the ID3 line 157 to transition between the voltage V2 and the voltage V0. The periods $T1x$, $T2x$ and $T3x$ of the pulses are correlated with the deterioration extent. In addition, the duty cycle ($T1y/T1x$, $T2y/T2x$, $T3y/T3x$) corresponding to a ratio of ON time to each pulse period is correlated with the remaining capacity.

Thereafter, the MPU 121 continues to transmit pulses until the cable assembly 51 is released through the ID4 line 159. In another transmission method, the MPU 121 transmits the remaining capacity and the deterioration information each time the EC 221 makes a request. For example, the MPU 121 sends two pulses when information is transmitted once, and then maintains the ID3 line 251 at the voltage V2. The EC 221 may enable the ID3 line 251 to transition to the voltage V0 when information is necessary, and, in response thereto, the MPU 121 may send two pulses for transmission of information.

In block 515, the EC 221 receives the pulses via the ID3 line 251 at a predetermined timing and displays the remaining capacity and the deterioration information on the LCD 207. In other words, the laptop PC 50 manages and uses the battery set 129 of the battery unit 100 in the same manner as the battery set 223 incorporated into the main body. The information displayed on the LCD 207 may include the kinds of devices (the battery set 223, the battery unit 100, and the AC/DC adaptor 10) which are able to supply power to the laptop PC 50 at present, and deterioration information and a remaining capacity regarding the battery set 223 and the battery set 129.

The EC 221 receiving the remaining capacity enables the laptop PC to transition to a stopping state when the remaining capacity of the battery set 129 is reduced to a limit and further by referring to the remaining capacity of the battery set 223, or enables the laptop PC 50 to transition to a hibernation state after data of the main memory 203 which is in progress of being worked is saved to the HDD 211. A user is able to determine an appropriate exchange timing of the battery set 129 from the deterioration information displayed on the LCD 207.

In block 607, the AC/DC adaptor 10 is released from the dedicated receptacle 13. If a voltage of the DC+ port of the common receptacle 41 is reduced, power is supplied from the battery set 129 to the laptop PC 50 via the diode 133. When the power source is changed from the AC/DC adaptor to the battery set 129, power is supplied via the diode 133 for a short time until the switch 115 is turned on, and thus a voltage of the DC+ port of the common receptacle 41 is not reduced. The MPU 121 detects that the voltage detection circuit 125 stops outputting, turns on the switch 115, and turns off the switches 15 and 103.

The operation procedure when the battery unit 100 in an independent state is connection is almost the same as that in FIG. 9, and thus only different procedures will be described with reference to FIG. 9. In a new procedure replacing block 601, the battery unit 100 completes a preparation for supply of power in an independent state as shown in block 407 of FIG. 8. In a new procedure replacing block 607, the AC/DC adaptor 10 may be connected to the battery unit 100.

The MPU 121 which has detected that a voltage of DC 20 V is applied to the DC+ port of the dedicated receptacle 13 through the voltage detection circuit 125 turns on the switches 15 and 103. As a result, in block 609, power is supplied from the AC/DC adaptor 10 to the DC+ port of the common receptacle 41, and charging of the battery set 129 is started as necessary.

The battery unit 100 is preferably thinned so as to be easily put in a bag by accommodating the battery set 129 in the casing. Therefore, since the battery unit 100 is put in a bag and the laptop PC 50 is able to be used on the lap in a train or a car, it is possible to extend the battery operation time of the thinned laptop PC which has been difficult up to now. In addition, it is not necessary to carry a dedicated battery charger as in an external battery in the related art, and, further, it is possible to save the trouble of exchanging a spare battery. Further, in a case where the commercial power source is able to be used at a movement destination, the laptop PC 50 is used while charging the battery set 129 by the AC/DC adaptor, and, during the movement, power is able to be supplied from the battery unit 100 in an independent state, thereby increasing convenience.

In a case where the battery set 223 is used by connecting the laptop PC 50 which is completely discharged to the battery unit 100 in an adaptor connection state, since the battery unit is continuously used without stopping of supply of power when the commercial power source fails, the battery unit also has a function as a UPS device (UPS). The battery set 129 may be a built-in battery which is incorporated into the casing of the battery unit 100 or may be a battery pack which is attachable to and detachable from a bay of the casing of the battery unit 100. In addition, in a case of the battery pack, the battery pack may be compatible with a battery pack of the laptop PC.

As has been described, the present disclosure provides a method for extending battery operation time of a portable electronic apparatus that is being powered by a DC power source such as an AC/DC adaptor.

Those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. An apparatus comprising:
    a first input receptacle configured to receive a first AC/DC adaptor having a first rated capacity;
    a second input receptacle configured to receive a second AC/DC adaptor having a second rated capacity higher than said first rated capacity;
    a single output receptacle configured to receive a cable assembly to which an electronic device having an appropriate power rating is connectable;
    a battery charger for charging a battery set using electrical power supplied by one of said AC/DC adapters;
    an output circuit for supplying electrical power to said electronic device from one of said AC/DC adapters when one of said AC/DC adapters is connected to one of said input receptacles, and for supplying electrical power to said electronic device from said battery set when none of said AC/DC adapters is not connected to said input receptacles; and
    a control circuit for controlling said battery charger
        to supply electrical power to said electronic device while charging said battery set when said electronic device has a power rating appropriate for said rated capacity of said one AC/DC adaptor is connected to one of said input receptacles, and
        to supply electrical power to only said battery set when said electronic device's power rating exceeds said rated capacity of said one AC/DC adaptor connected to one of said input receptacles.

2. The apparatus of claim 1, said apparatus further includes a step-up circuit for increasing an output voltage of said battery set.

3. The apparatus of claim 2, wherein said control circuit stops an operation of said step-up circuit when said electronic device is not connected to said single output receptacle.

4. The apparatus of claim 2, wherein said control circuit stops an operation of said step-up circuit when said electronic device connected to said single output receptacle is not consuming power.

5. The apparatus of claim 1, wherein said control circuit stops supplying power from one of said AC/DC adapters to said electronic device when said rated capacity of said one AC/DC adaptor connected to one of said input receptacles is different from a power specification of said electronic device connected to said single output receptacle.

* * * * *